MAGNETIC TRANSDUCER WITH REDUCED PORE VOLUME ADJACENT THE POLE TIPS
Filed Sept. 29, 1960
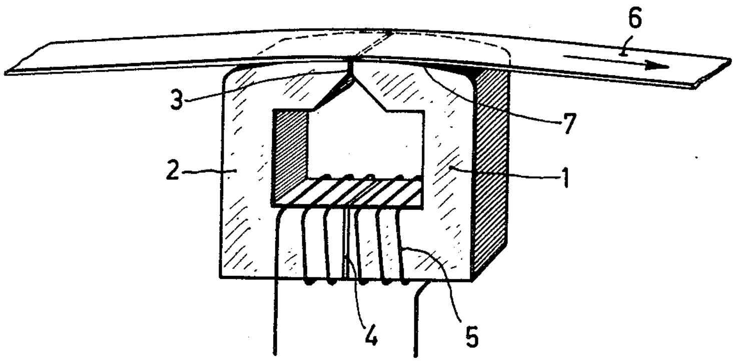
INVENTOR
Jules Bos
Simon Duinker
Andreas L. Stuijts
BY
Frank R. Trifari
AGENT 3,177,475

MAGNETIC TRANSDUCER WITH REDUCED PORE VOLUME ADJACENT THE POLE TIPS

Jules Bos, Simon Duinker, and Andreas Leopoldus Stuijts, all of Eindhoven, Netherlands, assignors to North American Philips Company, Inc., New York, N.Y., a corporation of Delaware

Filed Sept. 29, 1960, Ser. No. 59,249
Claims priority, application Netherlands, Oct. 2, 1959, 243,987
3 Claims. (Cl. 340—174.1)

The invention relates to a transducer made from sintered oxidic ferromagnetic material having cubic crystal structure, preferably a crystal size of from 10–20 microns and a pore volume of about 5%. Such a material is known under the registered trademark Ferroxcube.

The term "transducer" generally means an article by means of which electric energy is converted into magnetic energy or conversely. The present invention, however, relates solely to transducers subjected to mechanical aggressive forces, for example recording, reproducing and/or erasing heads for magnetic recording and/or reproducing apparatus, in which the carrier of the magnetic recording exerts comparatively large corrosive forces on the guiding surface of the head. Transducers which are used to produce mechanical vibrations in a fluid by means of their magneto-strictive properties and which may have their surface attacked by cavitation in said fluid, also fall under this category.

According to the invention such transducers are characterized in that the surfaces which in operation are subjected to aggressive mechanical influences have a pore volume which is much smaller than that of the remainder of the transducer. One of the most important causes of the destruction of these active surfaces of a transducer is the chipping of grains, in particular at the pore edges. It has now been found that by the use of the invention this disadvantage is eliminated so that the life both of the transducer and, as the case may be, of the carrier of magnetic recordings is appreciably prolonged.

In an embodiment of the invention the pore volume of the surfaces subjected to aggressive forces in operation is less than 1%.

Although the desired reduced pore space may be obtained in various manners, for example by recrystallisation of the prepolished surface after filling up the pores with finely powdered material, in an embodiment of the invention the surface is preferably ground by means of a tin disc provided with powdered diamond having a grain size of at most about 2 microns, the pressure applied being as high as possible while substantially no lubricant is used. Grinding and polishing of plates of Ferroxcube by means of a tin disc and powdered diamond is known; in this process, however, no high pressure is applied and a lubricant is used, so that the pore volume is not reduced. There are even indications that in this known process the finished surface shows increased pore volume.

The invention also includes a method of manufacturing a transducer from sintered oxidic material having cubic crystal structure, preferably a crystal size of from 10–20 microns and a pore volume of about 5%, which has surfaces which in operation are subjected to aggressive mechanical influences, the process being characterized in that these surfaces are ground by bringing them into engagement under the highest possible pressure and substantially without the use of lubricants with the surface of a tin disc provided with diamond grains having a maximum size of about 2 microns, while there is relative movement between the transducer and the disc.

The invention will be explained more fully with reference to a drawing which shows to a greatly enlarged scale a side elevation of a recording, reproducing and/or erasing head of magnetic recording and reproducing apparatus.

Reference numerals 1 and 2 denote two U-formed parts of the head which are joined to one another in known manner by two glass foils 3 and 4. An electric coil 5 is provided on corresponding limbs of these parts. A tape 6, which may comprise a foil of synthetic material coated with particles capable of being magnetized, in operation slides over a mildly rounded upper face 7 of the head in the direction of the arrow. The head is made from sintered oxidic ferromagnetic material having cubic crystal structure and a crystal size of from 10–20 microns, which material is known as Ferroxcube. This material has a pore volume of 5%. In practice it is found that crystals may become detached from the face 7, in particular from the pore edges, and these crystals damage not only the tape but also the head face. In addition, this detachment may cause more crystals to be dislodged, so that finally the head is destroyed. This chipping is particularly inconvenient at the upper edges of the gap filled by the glass foil 3 since it adversely affects the resolving power for short wavelengths to be recorded or reproduced. In order to prevent detaching or chipping, the upper face of the head is polished with the aid of the inside of a rotating tin cylinder coated with powdered diamond of a gradation of from 0–2 microns, the cylinder and the head being pressed to one another with the maximum feasible pressure. The magnitude of the pressure is solely determined by the compressive strength of the Ferroxcube and of the tin cylinder. There is substantially no lubrication; one or two drops of a lubricant, for example petroleum, may be desirable for washing off the material removed. On termination of the process, which for a head having an upper surface and an area of 1 cm.$^2$ may take 45 minutes with the use of a cylinder having an internal diameter of 200 mm. revolving at a speed of 2 revolutions per minute while the total pressure was 25 kg., the pore volume of the upper face was less than 1%. With this pore volume it is found that there is no longer any likelihood of crystals being dislodged or edges being chipped.

The upper surface of a transducer serving to produce ultrasonic vibrations in a fluid, for example water, is heavily attacked by cavitation so that breaking off and chipping may again result unless this surface has a pore volume which is far smaller than that of the remainder. An upper surface finished in the above-mentioned manner proves to be far better resistant against these aggressive influences. Obviously the shape of the tin disc must be adapted to the shape of the surface to be worked.

What is claimed is:

1. A magnetic transducer for converting electric energy to magnetic energy and vice versa comprising a sintered body of ferromagnetic ferrite material having a cubic crystal structure, a major portion of said body having a given pore volume, and means coupled to said body for converting magnetic energy in said body to electric energy and vice versa, said body having an active surface adapted to be coupled to a medium for receiving and transmitting energy to said body, a portion of said body immediately adjacent to and including said surface having a pore volume which is substantially less than said given pore volume whereby said surface can be subjected to aggressive mechanical influences without substantial destruction thereof.

2. A magnetic transducer for converting electric energy to magnetic energy and vice versa comprising a sintered body of ferromagnetic ferrite material having a cubic crystal structure, the crystals of which have an average diameter of about 10 to 20 microns, a major portion of said body having a pore volume of about 5%, and means coupled to said body for converting magnetic energy in said body to electric energy and vice versa, said body having an active surface adapted to be coupled to a medium for receiving and transmitting energy to said body, a portion of said body immediately adjacent to and including said surface having a pore volume which is substantially less than 5% whereby said surface can be subjected to aggressive mechanical influences without substantial destruction thereof.

3. A magnetic transducer for converting electric energy to magnetic energy and vice versa comprising a sintered body of ferromagnetic ferrite material having a cubic crystal structure, the crystals of which have an average diameter of about 10 to 20 microns, a major portion of said body having a pore volume of about 5%, and means coupled to said body for converting magnetic energy in said body to electric energy and vice versa, said body having an active surface adapted to be coupled to a medium for receiving and transmitting energy to said body, a portion of said body immediately adjacent to and including said surface having a pore volume of about 1% whereby said surface can be subjected to aggressive mechanical influences without substantial destruction thereof.

References Cited by the Examiner

UNITED STATES PATENTS

| | | | |
|---|---|---|---|
| 2,597,237 | 5/52 | Friend | 29—155.6 |
| 2,700,073 | 1/55 | Kleis et al. | 179—100.2 |
| 2,705,392 | 4/55 | Imler | 51—283 |
| 2,711,945 | 6/55 | Kornei | 179—100.2 |
| 2,715,659 | 8/55 | Ibuka | 179—100.2 |
| 2,911,481 | 11/59 | Augustin | 179—100.2 |
| 2,912,804 | 11/59 | Simjian | 51—281 |
| 2,920,149 | 1/60 | Koren | 179—100.2 |
| 2,945,919 | 7/60 | Neuman | 179—100.2 |

IRVING L. SRAGOW, *Primary Examiner.*

NEWTON N. LOVEWELL, *Examiner.*